(No Model.)
J. KASTEN.
Mold for Making Cement Pipes.
No. 240,521. Patented April 26, 1881.
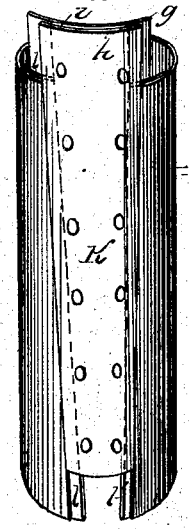
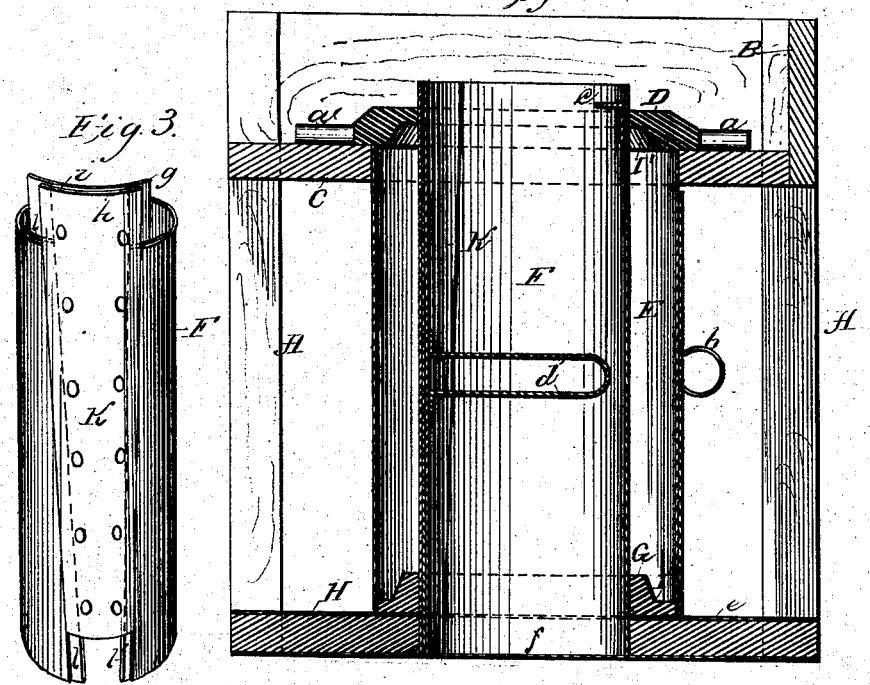
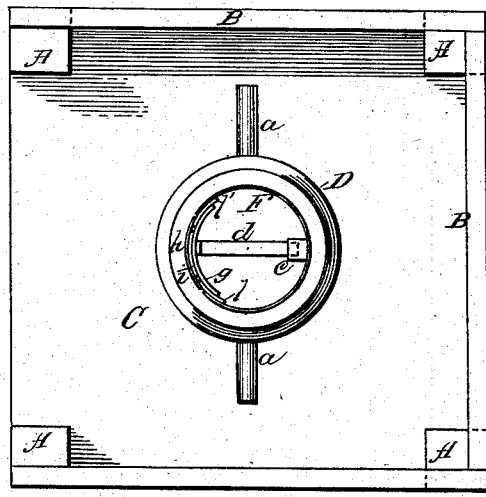
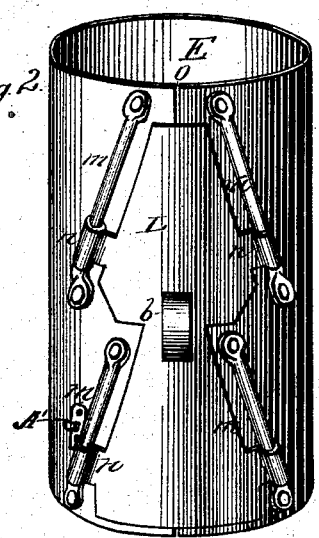
Witnesses:
E. G. Asmus
Charles F. Hunter
Inventor:
John Kasten
By Jas. R. Erwin
Attorney

UNITED STATES PATENT OFFICE.

JOHN KASTEN, OF MILWAUKEE, WISCONSIN.

MOLD FOR MAKING CEMENT PIPES.

SPECIFICATION forming part of Letters Patent No. 240,521, dated April 26, 1881.

Application filed February 12, 1881. (No model.)

*To all whom it may concern:*

Be it known that I, JOHN KASTEN, a citizen of the United States, residing at the city and county of Milwaukee, State of Wisconsin, have invented certain new and useful Improvements in Molds for Making Cement Pipe; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in a base-board for supporting and retaining the molds in a true vertical position, the peculiar slide for the exterior mold and the device for locking it in a closed position while the mold is being filled, and a device for contracting and withdrawing the interior mold from the cement pipe when formed, all of which is further explained by reference to the accompanying drawings, in which—

Figure 1 represents a vertical section. Fig. 2 is a top view. Fig. 3 is a perspective of the interior mold. Fig. 4 is a perspective of the exterior mold.

H is a base-board, upon which the molds are supported and retained in a true vertical position.

C is a platform or table, which is supported above the base-board by legs A A A A. The table C and base-board H are respectively provided with openings through their centers for the molds E F. The lower opening, $f$, in the base-board H closely fits the interior mold, and thus assists in retaining the mold more firmly in position. The opening in the table C is made larger, conforming in diameter to the exterior mold, E.

My invention pertains more particularly to the device for opening and closing the mold E, the device for opening and closing the mold F, and the device for raising or removing the mold F from the pipe, and the peculiar construction of the base-board, whereby it is adapted to retain the interior mold in a rigid vertical position.

Heretofore the interior mold, F, rested simply upon the upper surface of the base-board, and was supported at its lower end by the former or molding-ring I only. By my improvement the opening $f$ in the base-board is provided, as mentioned, to which the said mold is closely fitted, and whereby it is rigidly retained in a true vertical position, as shown.

The device for opening and closing the mold E consists in the plate L, provided with handle $b$ and slides N N N N and the slide-rods M M M M. The mold E is made of sheet metal, formed in a single piece in a cylindrical shape, having an opening, O, extending from end to end. The mold is adapted to be expanded and contracted by raising and lowering the plate L. Thus, when preparing the mold to be filled, the plate is pressed down, when the slides N, acting through the inclined rods M, draw the sides of the opening O together, and thus contract the mold, when, by an inverse movement of the plate L, the mold is expanded, when it is readily withdrawn from the cement pipe as soon as the cement is set, which requires but a moment's time.

The device for contracting and expanding the interior mold, F, and withdrawing it from the interior of the cement pipe consists in the angular plate K, formed of two plates, $i$ and $g$, between which a recess is provided upon its respective sides for the reception of the flanges $l\ l$, and handle $d'$, extending at right angles thereto across the interior opening, and adapted to engage against the lug C at the opposite side of the openings, and arrest the upward movement of the plate K, whereby mold F is contracted and freed from the inner walls of the cement pipe, when, by a continuous upward movement, the plate K and mold F are withdrawn together.

It is obvious that by an inverse movement of the handle $d'$ the angular or wedge-shaped plate K is pressed between the flanges $l\ l$ and the mold is expanded.

A' is a locking device, by which the plate L is securely retained in the position shown in Fig. 4 when filling the mold with cement. The device A' consists in a loosely-pivoted plate or button provided with a shoulder adapted to engage upon the upper end of one of the slides N when the plate L is down, and may be turned out of contact therewith when desirous of raising the plate L.

Having thus described my invention, I do not claim, broadly, as my own the table C, the molding or forming rings a' and I, cylinders E and F, or slide K, as I am aware that they are not new.

What I claim as my invention, and desire to secure by Letters Patent, is—

1. In elastic sheet-metal molds for forming cement pipe, the device herein described for contracting and withdrawing the mold, consisting in the combination of plate K, handle d, mold F, and lug C, the handle d being adapted to engage against the lug C as the slide K is being withdrawn, whereby a single movement only is required to both contract and withdraw the mold from the pipe.

2. The combination of the mold E, slide-rods M M M M, plate L, provided with slides N N N N, and button A', all substantially as and for the purpose specified.

In testimony whereof I affix my signature in presence of two witnesses.

JOHN KASTEN.

Witnesses:
   JAS. B. ERWIN,
   F. KASTEN.